(12) United States Patent
Sauve

(10) Patent No.: US 6,672,510 B2
(45) Date of Patent: Jan. 6, 2004

(54) BAR CODE ARRANGEMENT FOR IDENTIFYING POSITIONS ALONG AN AXIS

(75) Inventor: Eric Sauve, Les Cedres (CA)

(73) Assignee: Scannabar (3193519 Canada Inc.), Montreal (CA)

(*) Notice: Subject to any disclaimer, the term of this patent is extended or adjusted under 35 U.S.C. 154(b) by 0 days.

(21) Appl. No.: 10/027,853

(22) Filed: Dec. 20, 2001

(65) Prior Publication Data

US 2003/0116629 A1 Jun. 26, 2003

(51) Int. Cl.7 .......................... G06K 7/10; G08C 21/00
(52) U.S. Cl. ..................... 235/462.07; 235/462.01; 235/462.15
(58) Field of Search ................. 235/462.07, 462.01, 235/462.02, 462.04, 462.1, 462.32, 462.25

(56) References Cited

U.S. PATENT DOCUMENTS

| | | | | |
|---|---|---|---|---|
| 3,774,309 A | * | 11/1973 | Leopoldi | 33/769 |
| 4,794,239 A | * | 12/1988 | Allais | 235/462.1 |
| 4,929,818 A | * | 5/1990 | Bradbury et al. | 235/381 |
| 5,086,215 A | | 2/1992 | Carsner et al. | 235/462.08 |
| 5,276,400 A | * | 1/1994 | Denyer et al. | 324/750 |
| 5,296,690 A | * | 3/1994 | Chandler et al. | 235/462.1 |
| 5,304,787 A | * | 4/1994 | Wang | 235/462.09 |
| 5,444,231 A | | 8/1995 | Shellhammer et al. | 235/462.12 |
| 5,489,769 A | * | 2/1996 | Kubo | 235/462.09 |
| 5,514,858 A | | 5/1996 | Ackley | 235/462.16 |
| 5,551,729 A | * | 9/1996 | Morgan | 283/94 |
| 5,593,784 A | * | 1/1997 | Chinzi | 428/413 |
| 5,739,520 A | * | 4/1998 | Atsumi et al. | 235/462.45 |
| 5,798,510 A | | 8/1998 | Watanabe et al. | 235/462.25 |
| 5,821,519 A | | 10/1998 | Lee et al. | 235/462.27 |
| 6,032,861 A | | 3/2000 | Lemelson et al. | 235/456 |
| 6,047,892 A | | 4/2000 | Schuessler et al. | 235/462.09 |
| 6,145,745 A | | 11/2000 | Hauser et al. | 235/462.07 |
| 6,155,485 A | * | 12/2000 | Coughlin et al. | 235/383 |
| 6,283,370 B1 | | 9/2001 | Watanabe et al. | 235/462.07 |
| 6,293,466 B1 | * | 9/2001 | Fujita et al. | 235/462.02 |
| 6,450,406 B2 | * | 9/2002 | Brown | 235/462.45 |

FOREIGN PATENT DOCUMENTS

EP    0 449 634 B1    7/1997 ............ 235/462.27

* cited by examiner

Primary Examiner—Michael G. Lee
Assistant Examiner—Kumiko C. Koyama
(74) Attorney, Agent, or Firm—Merchant & Gould P.C.

(57) ABSTRACT

A bar code arrangement allows determining positions along an axis. The bar code arrangement includes a plurality of bar code symbols, each having start and stop end characters and encoded data therebetween. The symbols are positioned in a column along the axis and are so oriented that each bar of the symbols is parallel to the axis and that two consecutive bar code symbols have different orientations, one being rotated 180° relative to the other. Scanning the bar code symbol corresponding to a particular position among the plurality of bar code symbols in the column allows identification of the particular position along the axis. A symbol scan is considered successful when two different characters are found in a symbol scan. In the form of a ribbon, this bar code arrangement is suitable to correctly detect a liquid level on a bottle of liquid.

28 Claims, 5 Drawing Sheets

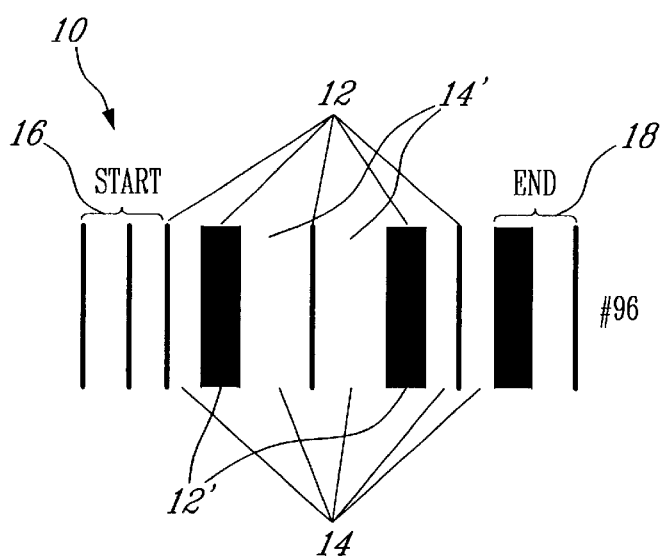
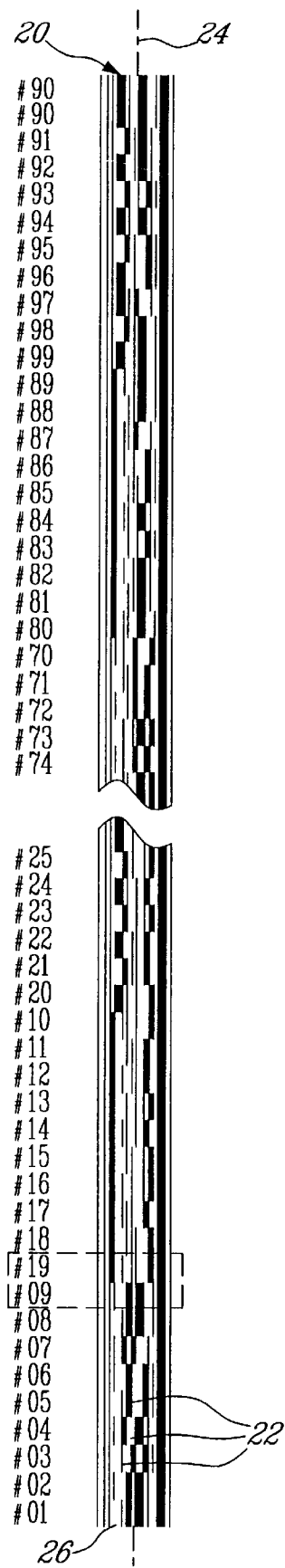
Fig. 1 PRIOR ART
Fig. 2 PRIOR ART

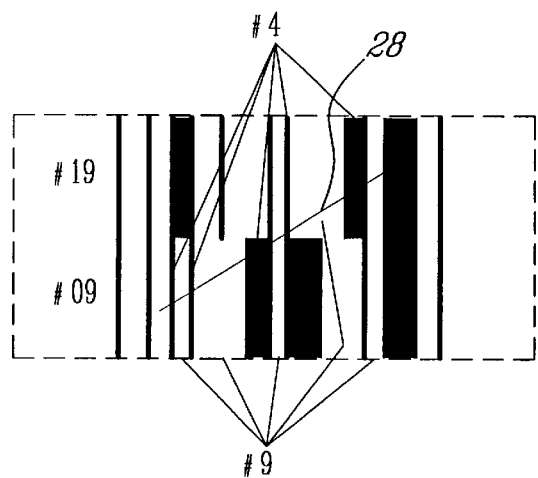
Fig. 3 PRIOR ART
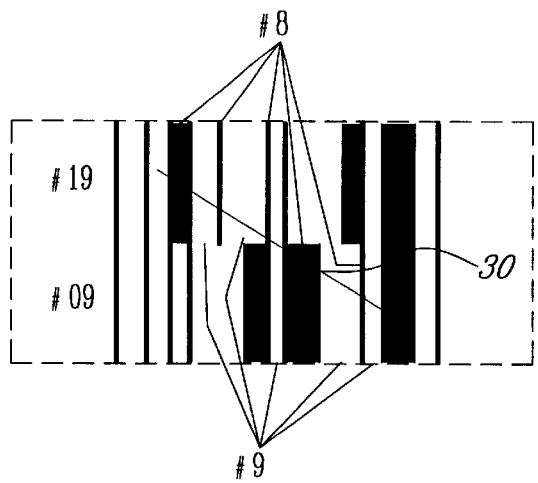
Fig. 4 PRIOR ART
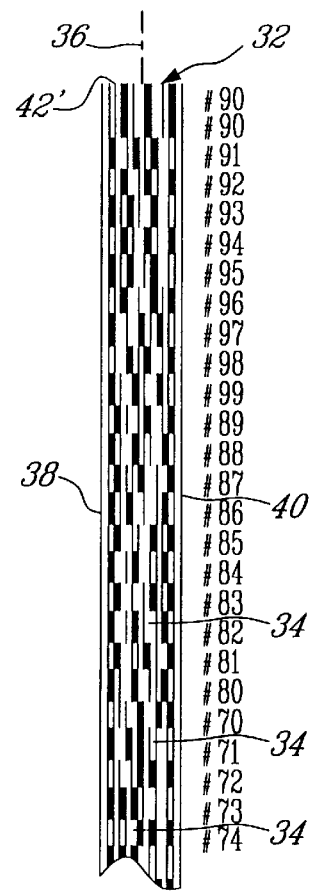
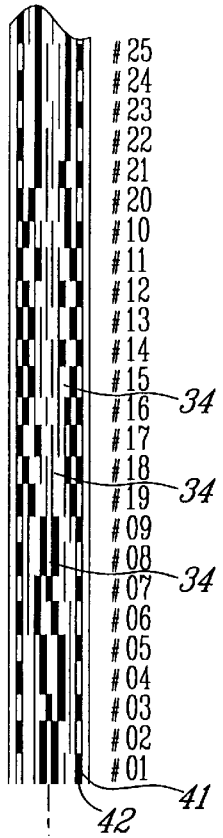
Fig. 5

FIG_7

BAR CODE ARRANGEMENT FOR IDENTIFYING POSITIONS ALONG AN AXIS

FIELD OF THE INVENTION

The present invention relates to bar codes. More specifically, the present invention is concerned with the use of bar codes for measurement.

BACKGROUND OF THE INVENTION

Bar codes are widely used for identifying and tracking objects. Their applications are numerous, including sorting and inventory management.

A bar code symbol typically includes a sequence of consecutive parallel bars and spaces of varying widths that are either printed directly onto the object or printed onto labels that are affixed to the object. The bar codes are generally read by a scanning light source, such as a laser, often in the form of a handheld device. The beam of light projected onto the bar code produces a spot that is moved by an oscillating motor to produce a line or a series of lines across the bars and spaces. A sensor detects the light reflected form the bar code and converts it into an electric signal to be interpreted (or decoded) by an electronic circuit or software.

Bar codes may have different structures, each requiring a different set of rules and definitions to be interpreted. Examples of such a structure include Universal Product Code (UPC), Code 39, Codabar, and Interleaved 2 of 5. For concision purposes, the "Interleaved 2 of 5" bar code structure will be referred to herein simply as "Interleaved"

The structure of an Interleaved bar code 10 is illustrated in FIG. 1. "Interleaved" is a numbers-only bar code system that can only handle numbers having a even number of digits. This bar code system is said to be interleaved, because a first digit is encoded in the bars 12, and a second digit is encoded in the spaces 14. There are five bars 12, two of which 12' are wide and five spaces 14, two of which 14' are also wide. The interleaved 2 of 5 system allows the representation of numbers having an infinite number of digits, provided that there is a surface large enough to hold the symbols.

In the case of FIG. 1, the number 96 is provided as an example. The first digit 9 is represented by the bars 12, and the second digit 6 is represented by the spaces 14.

Bar codes, according to the "Interleaved" encoding system, include start and stop characters 16 and 18 as explained hereinbelow.

The use of the "Interleaved" structure is advantageous in many applications since it allows holding up to 18 digits per inch when printed using a 0.19 mm X dimension. As is well known in the art, the X-dimension is the width of the smallest element in a bar code symbol.

It is to be noted that, in the case of "Interleaved" symbols, the use of check digit is optional.

Since bar codes, in general, and the "Interleaved 2 of 5" system in particular, are believed to be well known in the art, they will not be described herein in further detail.

Most recent developments in bar code technology have aimed to increase the quantity and diversity of data supported by bar code symbols. However, new possibilities made possible by these new technologies remain in the context of sorting and inventory management.

Recently, a new application for bar code symbols has been in use as a measurement tool. Indeed, by aligning bar code symbols along an axis, and by predetermining positions corresponding to each bar code symbol, the scanning of a symbol may readily allow the retrieval of the coordinates of this position along the axis.

Turning now to FIG. 2 of the appended drawings, a bar code ribbon 20, according to the prior art, will now be described.

The bar code ribbon 20 comprises a plurality of bar code symbols 22 positioned in a column along the axis 24. Although the example of FIG. 2 is illustrated with symbols representing numbers using the "Interleaved 2 of 5" encoding system, other bar code systems can also be used. The numbers represented by each bar code symbol 22 have been provided in FIG. 2 to the left of each symbol 22.

To use the ribbon 20 for measuring positions on an object (not shown), a calibration of the ribbon 20 is first carried out. The calibration consists of measuring the distance from one end 26 of the ribbon 20 to each bar code symbol 20, and by associating this distance to a corresponding symbol 20.

In operation, by correctly positioning the bar code ribbon 20 on or near an object (not shown), positions on this object along the axis 24 may be readily determined using a conventional bar code scanner and an appropriate apparatus for decoding the symbols 20.

Of course, the ribbon 20 has to be adequately positioned on or near the object and the height of the bar code symbols should be small enough to provide the precision required by the application. The ribbon 20 can then be seen as a ruler.

Although bar code symbols encoded by other systems may be used, the use of the "Interleaved 2 of 5" is advantageous, since it allows for the use of smaller bar code symbols when required by the application.

A major drawback in the use of a column of adjacent bar code symbols to measure the position on an object is that the smaller the height of the symbol is, the less the orientation of the bar code scanning beam has to deviate from the horizontal to cause an incorrect reading.

FIGS. 3 and 4 illustrate how an oblique scanning beam may cause an incorrect reading of a bar code symbol when there is at least one other bar code symbol adjacent to the one being scanned.

In FIG. 3, it is shown that a beam scanning between the symbols representing the numbers 09 and 19 on the ribbon 20 along the direction represented by line 28 may incorrectly yield the decoded number 49.

In FIG. 4, it is shown that a beam scanning between the symbols representing the numbers 09 and 19 on the ribbon 20 along a direction opposite to the direction of line 28 in FIG. 3, as represented by line 30, may in this case incorrectly yield the decoded number 89. It is to be noted that, in some applications, the positions of the symbols representing the numbers 49 and 89 may be far enough from the actual scanning position to cause significant detrimental results.

A proposed solution to this problem is to use check digits on the symbols along with the encoded values. The use of check digits allows detection of incorrect readings resulting from a bad scan. However, a drawback of this solution is that it requires larger symbols, which, in some applications, may not be possible.

Of course, as illustrated in FIG. 2, the sequence of symbols may also be chosen so as to minimize the possibility or the impact of an incorrect reading, but, again, this may not be possible in some applications.

Another solution would be to provide the scanner with a means to ensure an adequate positioning relative to the symbols to scan. However, this would require either modifications to existing scanning technologies or scanning processes, which would not be universal, or a scanning method so complicated that it would cancel most of the advantages of the existing bar code scanning technology.

SUMMARY OF THE INVENTION

More specifically, in accordance with the present invention, there is provided a bar code arrangement for identifying positions along an axis, the arrangement comprising: a plurality of bar code symbols, each having start and stop end characters and encoded data therebetween; each symbol being positioned in a column along the axis and being so oriented that each bar of the symbols is parallel to the axis and that two consecutive bar code symbols have different orientations, one being rotated 180° relative to the other; whereby a particular position along the axis may be identified by scanning the bar code symbol corresponding to the particular position among the plurality of bar code symbols in the column; a symbol scan being considered successful when two different characters are found in the symbol scan.

According to second aspect of the invention, there is provided a bar code ribbon for identifying positions along an object, the ribbon comprising: two generally parallel longitudinal sides extending along an axis; two opposite faces, each spanning between the two longitudinal sides; one of the two opposite faces having a plurality of bar code symbols printed thereon, each having start and stop end characters and encoded data therebetween; the plurality of bar code symbols being positioned on top of each other and being so oriented that their bars are parallel to the axis, and that no two consecutive bar code symbols have corresponding end characters on the same side; whereby a particular position along the ribbon may be identified by scanning the bar code symbol corresponding to the particular position among the plurality of bar code symbols in the column; a symbol scan being considered successful when two different characters are decoded following the symbol scan.

According to a third aspect of the invention, there is provided a bar-inventory management system comprising: a computer server including instructions for managing an inventory; a plurality of bar code ribbon according to the present invention to be affixed to liquor bottles; and at least one bar code scanner connected to the computer, and being configured so as to read the bar code symbols on the bar code ribbons.

According to a fourth aspect of the invention, there is provided method for identifying positions along an axis on an object, the method comprising: providing a unique bar code symbol at predetermined positions along the axis; each bar code symbol having start and stop end characters and encoded data therebetween; each bar code symbol being positioned in a column along the axis and being so oriented that each bar of the symbols is parallel to the axis and that two consecutive bar code symbols have different orientations, one being rotated 180° relative to the other; associating in a computer database each the unique bar code symbol to a corresponding one of the predetermined positions along the axis; scanning a position along the axis until a bar code symbol having two different end characters is found; and searching in the computer database the position associated to the last scanned position.

Other objects, advantages and features of the present invention will become more apparent upon reading the following non-restrictive description of preferred embodiments thereof, given by way of example only with reference to the accompanying drawings.

BRIEF DESCRIPTION OF THE DRAWINGS

In the appended drawings:

FIG. 1, which is labelled "prior art", is a schematic view of a bar code symbol according to the "Interleaved 2 of 5" system;

FIG. 2, which is labelled "prior art", is a top plan view of a bar code ribbon according to the prior art;

FIG. 3, which is labelled "prior art", is an enlarged view of the dashed portion from FIG. 2, including a scanning beam oriented along a first oblique direction;

FIG. 4, which is labelled "prior art", is the enlarged view from FIG. 3, including a scanning beam oriented along a second oblique direction;

FIG. 5 is a top plan view of a bar code ribbon according to an embodiment of the present invention;

DESCRIPTION OF THE PREFERRED EMBODIMENT

Figure 6:
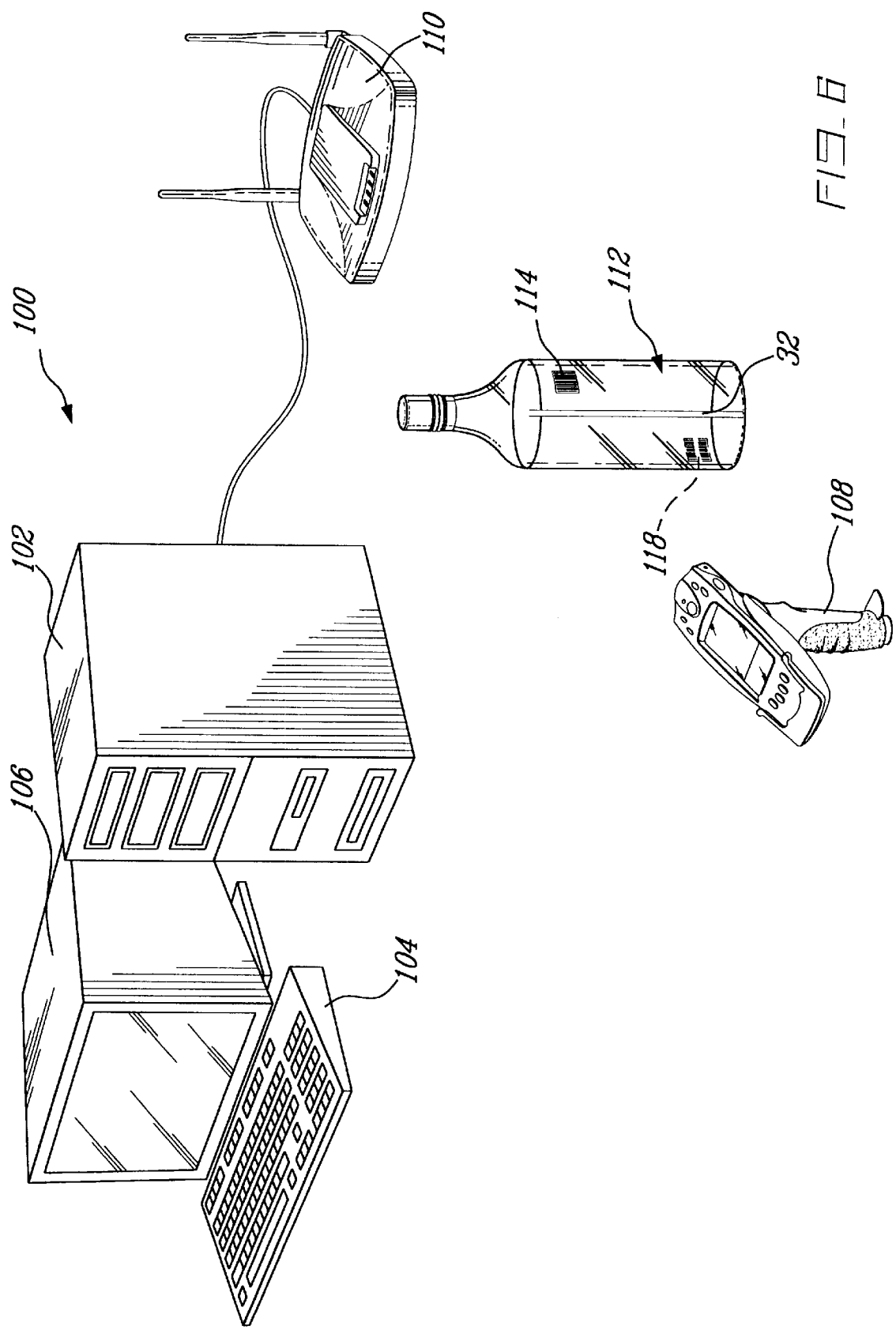
FIG. 6 is a perspective view of a bar-inventory management system according to an embodiment of the present invention, including the bar code ribbon of FIG. 5.

Turning now to FIG. 5, a bar code ribbon 32, according to an embodiment of the present invention, is illustrated.

On one of its two opposite faces, the bar ribbon 32 comprises a plurality of bar code symbols 34 positioned on top of each other along a longitudinal axis 36, representing a bar code arrangement. The series of adjacent symbols 34 are so positioned so as to generally form a single column aligned along the axis 36, and having two longitudinal sides 38 and 40. Each of the symbols 34 is so oriented that its bars are parallel to the axis 36.

The symbols 34 on the ribbon 32 correspond to the "Interleaved 2 of 5" encoding system. As has been explained hereinabove, and as illustrated in FIG. 1, each of the symbols 34 therefore has start and stop end characters and encoded data therebetween.

Each other symbol 34 has been printed on the ribbon 32 in an orientation rotated from 180° relative to the others, so that no two consecutive symbols have the same end character (start or stop) on the same side 38 or 40.

Even though, consecutive symbols 34 are shown adjacent in FIG. 5, some applications may require that the symbols 34 be printed onto the ribbon 32 with gaps therebetween.

In operation, the ribbon 32 is positioned on or near an object to measure, as one would do with a conventional dimensionally stable tape-measure. However, since bar code scanning requires the use of a bar code scanner, which is usually in the form of a handheld device, it may be preferable to fix the ribbon 32 directly onto the object. The ribbon 32 may therefore be of the self-adhesive type, i.e. provided with glue or other adhesive on its back.

As illustrated in FIG. 5, and as explained hereinabove with reference to FIG. 2, different numbers are represented by the different symbols 34 on the ribbon 32. Any information may be associated in a database with each of these numbers, such as the characteristics of the material on the object corresponding to that position, a color, etc., and of course, an absolute coordinate or a relative coordinate position.

Indeed, by knowing the distance between one of the symbols, such as the symbols 41 at one of the two longitudinal ends 42–42', and each of the other symbols, and by correlating the absolute position of this reference symbol 41 with an actual known position on the object to be measured, the reading of any symbols 34 on the ribbon 32 may provide the coordinate of other positions on the object to measure along the axis 36.

Of course, since each symbol 34 has a predetermined height, the precision of the ribbon as a position or distance-measuring tool is limited. As has been explained hereinabove, increasing the density of symbols on the ribbon 32 may increase the precision that may be obtained by the ribbon. Of course, the minimum height allowed for a symbol 34 is determined by the scanning technology to be used to read and decode the symbols 34. Obviously, the height of a symbol 34 is determined by the spanning of a symbol 34 in the direction of the axis 36.

The bar code arrangement from the present invention, as printed on the ribbon 32, prevents incorrect readings caused by incorrect orientations of a scanning beam. Indeed, if a scanning beam were so oblique relative to the preferred scanning orientation that the scanning beam catches part of a first symbol and part of another symbol adjacent to the first one, the scanned bar code would include two identical end characters. It is to be noted that the preferred scanning orientation is considered perpendicular to the axis 36. Since the decoded bar code does not include a start and a stop end character in this case, the reading is considered invalid and therefore an incorrect reading is detected.

The ribbon 32 allows identification of a particular position along the axis 36 by scanning the bar code symbol 34 corresponding to this particular position among the plurality of bar code symbols in the column. A symbol scan is considered as being successful when two different end characters are found.

Alternatively, other bar code systems that include a means to detect the orientation of the symbols may be used instead of the "Interleaved 2 of 5".

Although the bar code arrangement, according to the present invention has been described printed on a ribbon, a bar code arrangement, according to an embodiment of the present invention, may be printed on any other support, including the actual object on which a position is to be determined.

As will now appear obvious to a person skilled in the art, the bar code arrangement may have different lengths depending on the measurement requirement.

Turning now to FIG. 6, a bar-inventory management system 100, according to an embodiment of the present invention, is illustrated. The system 100 incorporates a plurality of ribbons 32.

The bar-inventory management system 100 comprises a server computer 102, including conventional input 104 and output 106 devices, respectively in the form of a keyboard and a display monitor, a plurality of wireless bar code scanners 108 (only one shown), a wireless access point 110 for remotely connecting the scanners 108 to the server computer 102, and a plurality of bar code ribbons 32 (only one shown) to be affixed onto liquor or wine bottles 112 (only one shown).

The bar code scanners 108 are in the form of wireless handheld devices. Examples of such scanning devices are the Symbol™ PPT 2742 and PPT 2746.

The bar code scanners 108 are wirelessly connected to the server 102 via the access point 110. Alternatively, the bar code scanners 108 may be connected to the server 102 via conventional cables (not shown). Of course, the number and configuration of the bar code scanners 108 and access point 110 may vary.

Since bar code scanners and access points are believed to be well known in the art, and for concision purposes, they will not be described herein in further detail.

The computer server 102 may take many forms, including a desktop computer and a laptop computer. The server 102 includes a storing means in the form of a hard drive, disk drive, CD-ROM drive, DVD-ROM drive, or other conventional storing means, allowing the storage information related to the bottle inventory and also the characteristics of each bottle, as will be explained hereinbelow. This information is collected and stored in one or more databases.

The server 102 is also programmed with a method for decoding the bar code symbols 34. Since algorithm for decoding bar code symbols is believed to be well known in the art, it will not be described herein in further detail. It is to be noted, however, that a bar code arrangement according to the present invention, may be decoded using a conventional bar code decoding algorithm.

Other configurations and features of the computer server 102 will become apparent upon reading the following description.

Of course, the server 102 includes conventional programmed instructions for inventory management.

The scanner 108 may also be of the programmable-type allowing, for example, autonomy whenever the connection with the server 102 is temporally interrupted.

Each of the components of the bar-inventory system 100 will now be described in further detail with reference to the operation of the system 100.

Figure 7:
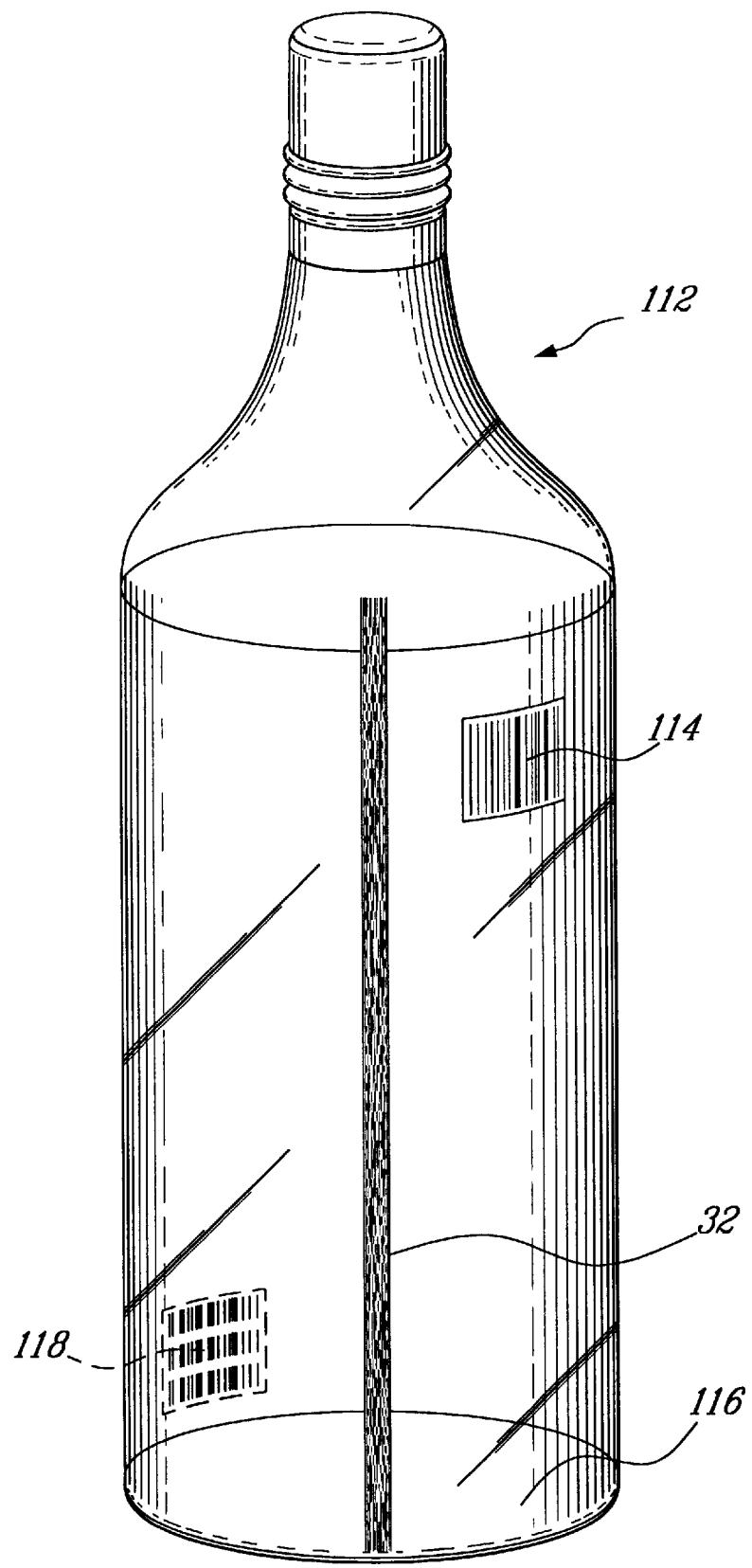
FIG. 7 is a perspective view of the bottle of liquor from FIG. 6.

Turning briefly now to FIG. 7, upon receiving new liquor bottles 112, a conventional bar code symbol 114 is affixed to each bottle 112 to allow tracking of the bottle in the inventory. In addition, a bar code ribbon 32 is affixed to every bottle whose variation of content needs to be tracked. The ribbon is affixed onto the bottle so that it extends generally from the bottom of the bottle perpendicularly therefrom. The inventory bar code 114 may be encoded using any system, provided that the scanner 108 is programmed with the corresponding decoding algorithm.

To allow the provision of an accurate indication of the volume content of each bottle 114, the ribbon 32 is affixed to the bottle 114 so that its bottom end 42 is flush with the inner bottom 116 of the bottle 114. Of course, depending on the calibration method, the ribbon may be positioned differently to the bottle 114.

As discussed hereinabove, the ribbon includes adhesive means, such as glue, on its face not having the bar code arrangement printed thereon, i.e. its back. Alternatively, other adhesive means may also be used. Obviously, the glue is so chosen so as to provide adherence on glass or plastic and for different conditions, including cold temperatures and humidity. The ribbon may further include a removable paper protector covering the adhesive, therefore facilitating the handling of the ribbon 32 before it is affixed onto a bottle 112.

Since the ribbons 32 are affixed on a curved surface, their widths are small enough to provide good adherence and also to minimize the possibility of incorrect readings. For example, the "Interleaved 2 of 5" encoding system allows for the printing of symbols small enough to provide good adherence and to minimize incorrect readings. It has been found that ribbons having a width of about 8 mm are suitable for the requirement of bottle scanning using conventional bar code scanners.

Bottles 32 are identified using the inventory bar code 114. Information related, for example, to the type of liquor and to the volume of the bottle 112, has been pre-determined by scanning the manufacturer or distributor bar code 118, usually present on the sticker of the bottle 112. This information is associated with the inventory bar code 114, and to the corresponding information, as previously stored in an inventory database of the server 102.

At predetermined intervals, or whenever one of the bottles 112 in the inventory is moved, the placement of any bottle 112 in a location or in a plurality of locations (bars), is updated in the computer database by scanning the inventory bar code 114.

The scanner 108 is programmed so as to allow input by the user relative to its location on the premises. Alternatively, a bar code (not shown) representative of the location of the bottle 112 may be provided in such locations. The user would then scan the location bar code, and the computer 102 would be configured to associate the following data entries with the correct location.

The volume of liquor in a bottle 112 can also be known by scanning the ribbon 32 at the position of the ribbon 32 corresponding to the level of liquid in the bottle 112.

A calibration is performed for each different type of bottle in the inventory prior to any measurement of the volume. The calibration includes gradually filling the bottle 112 with a liquid, and scanning, with the scanner 108, the symbol 34 along the ribbon 32, corresponding to the level of liquid in the bottle 112. The number corresponding to the scanned symbol 34 is associated with the corresponding level and volume of liquid in the database.

Obviously, the calibration process may be performed only once for every configuration and shape of bottle. Indeed, the database may include information related to volume and shapes of different types of bottles, as determined by the manufacturer's bar code symbol 118, and associate the corresponding calibration information to the bottle, as identified by the inventory bar code symbol 114.

A scan may be performed any time on a calibrated bottle, and the server computer 102 and/or scanner 108 will use the inventory database calibration information to determine the volume of liquid in the scanned bottle 112.

Whenever the deflection of the beam of the scanner 108 is too oblique relative to the preferred scanning direction, and reads portions of two consecutive symbols 34, the scanner 108 will detect an incorrect reading, since two identical end characters will be detected.

The bar-inventory management system 100 is configured so as to output an error signal in the form, for example, of a particular sound coming preferably from the scanner 108 whenever an incorrect reading is decoded. Alternatively, the system 100 and more precisely, the scanner 108, may be configured so as to issue a sound whenever a valid reading has been recognized.

It is to be noted that the bar code arrangement, according to the present invention prevents false readings due to incorrect orientation of the scanner 108 during a scan, while providing acceptable precision of the volume reading.

Moreover, the bar code arrangement, according to the present invention, may be printed on a relatively narrow ribbon, thereby minimizing false readings caused by the curvature of the bottles 112, and of the ribbons 32 becoming unstuck from the bottles 112.

Alternatively, two separate databases may be used to store inventory information and bottle configuration information.

Of course, the bar-inventory management system 100 may have other configurations and features. For example, the computational functions of the scanner 108 and of the server 102 may be interchangeable.

Even though the present invention has been described with reference to an application where the liquid level in bottles is measured, a bar code arrangement, according to the present invention, may also allow measuring, for example, any level or any position on an object or any length.

Figure 8:
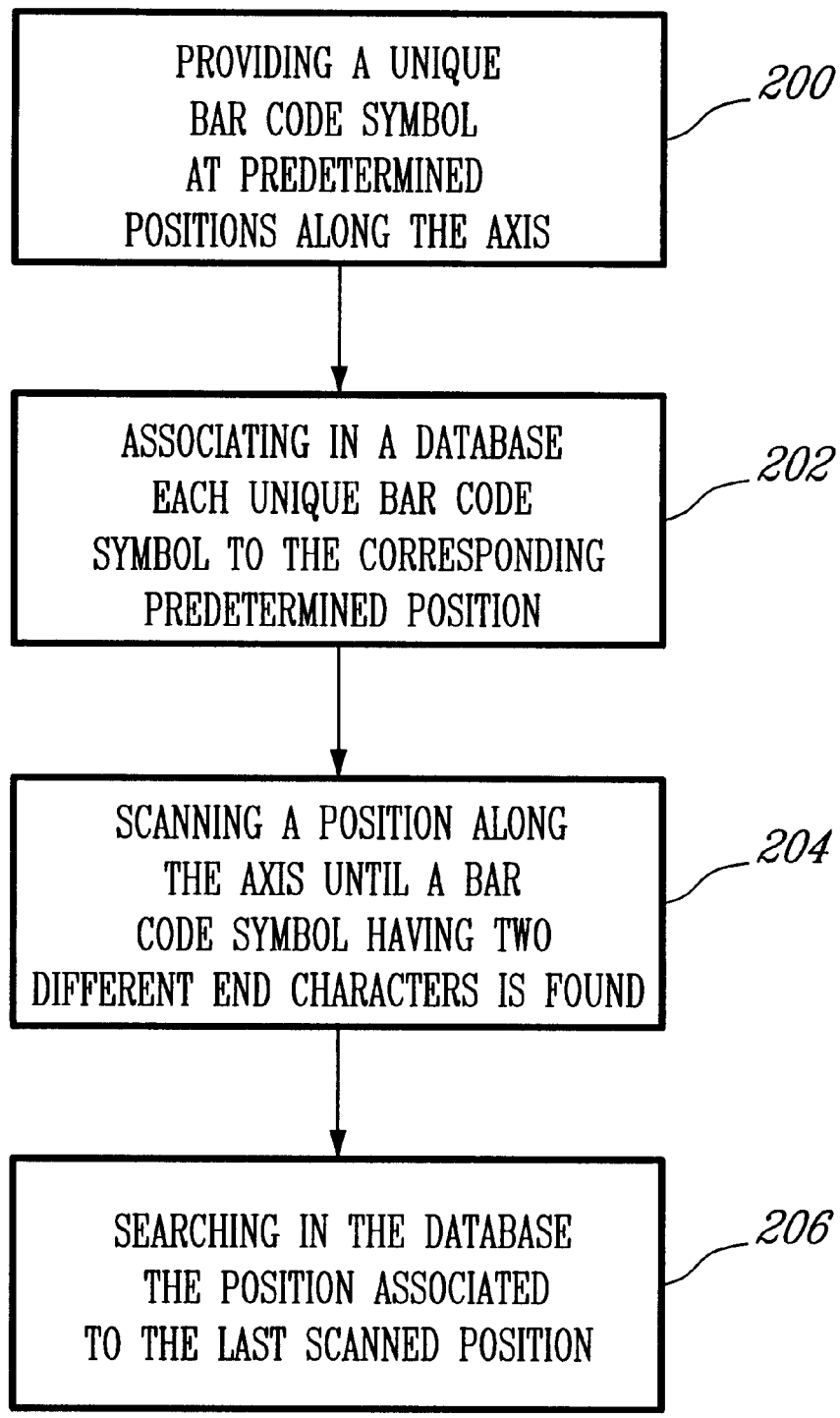
FIG. 8 is a flowchart of a method for identifying positions along an axis on an object, according to an embodiment of the present invention.

FIG. 8 of the appended drawings describes a method for determining a position on an object along an axis, according to an embodiment of the present invention.

It is to be noted that the unique bar codes, provided in step 200, are positioned on the object following a bar code arrangement, according to the present invention.

Of course, this method may vary as described hereinabove in further detail.

Although the present invention has been described hereinabove by way of preferred embodiments thereof, it can be modified without departing from the spirit and nature of the subject invention, as defined in the appended claims.

What is claimed is:

1. A bar code arrangement for identifying positions along an axis, the arrangement comprising:
    a plurality of bar code symbols, each having start and stop end characters and encoded data therebetween; each symbol being positioned in a column along the axis and being so oriented that each bar of the symbols is parallel to the axis and that two consecutive bar code symbols have different orientations, one being rotated 180° relative to another;
    whereby a particular position along the axis is identified by scanning the bar code symbol corresponding to said particular position among said plurality of bar code symbols in said column; a symbol scan being considered successful when two different characters are found in said symbol scan.

2. A bar code arrangement as recited in claim 1, wherein each symbol represents a different two digit number.

3. A bar code arrangement as recited in claim 1, wherein each two consecutive bar code symbols in said column are adjacent.

4. A bar code arrangement as recited in claim 1, wherein at least one of said bar code symbols corresponds to the "Interleaved 2 of 5" encoding system.

5. A bar code arrangement as recited in claim 1, wherein at least two of said plurality of bar code symbols have different heights.

6. A bottle having a bar code arrangement as recited in claim 1 printed thereon, said bar code arrangement extending generally perpendicularly from the bottom of the bottle.

7. A bar code ribbon for identifying positions along an object, the ribbon comprising:
    two generally parallel longitudinal sides extending along an axis;
    two opposite faces, each spanning between said two longitudinal sides;
    one of said two opposite faces having a plurality of bar code symbols printed thereon, each having start and stop end characters and encoded data therebetween; said plurality of bar code symbols being positioned on top of each other and being so oriented that their bars are parallel to the axis, and that no two consecutive bar code symbols have corresponding end characters on a same side;

whereby a particular position along the ribbon is identified by scanning the bar code symbol corresponding to said particular position among said plurality of bar code symbols in said column; a symbol scan being considered successful when two different characters are decoded following said symbol scan.

8. A bar code ribbon as recited in claim 7, wherein one of said plurality of symbols is a reference symbol.

9. A bar code ribbon as recited in claim 7, wherein information is associated in a computer database to at least one of said plurality of bar code symbols.

10. A bar code ribbon as recited in claim 9, wherein said information is related to at least one of a position on the object along said axis, and a characteristic of the object at the position corresponding to said at least one of said plurality of bar codes.

11. A bar code ribbon as recited in claim 7, wherein each symbol represents a different two digit number.

12. A bar code ribbon as recited in claim 7, wherein at least two of said plurality of bar code symbols have different heights.

13. A bar code ribbon as recited in claim 7, further comprising adhesive on the other of said two opposite faces.

14. A bar code ribbon as recited in claim 13, further comprising a removable paper protector covering said adhesive.

15. A bottle having a bar code ribbon as recited in claim 7 affixed thereon; said bar code ribbon extending generally perpendicularly from the bottom of the bottle.

16. A bar code ribbon for identifying positions along an object comprising:

two opposite faces;

one of said two opposite faces having a plurality of bar code symbols printed thereon, each having start and stop end characters and encoded data therebetween; said plurality of printed bar code symbols being positioned in a column generally defining a longitudinal axis; each symbol being so oriented that each bar of the bar code symbols is parallel to the axis and that two consecutive bar code symbols have different orientations, one being rotated 180° relative to another;

whereby a particular position along the ribbon is identified by scanning the bar code symbol corresponding to said particular position among said plurality of bar code symbols in said column; a symbol scan being considered successful when two different end characters are decoded following said symbol scan.

17. A bar-inventory management system comprising:

a computer server including instructions for managing an inventory;

a plurality of bar code ribbons to be affixed to liquor bottles; each of said plurality of bar code ribbons having two opposite faces; one of said two opposite faces having a plurality of bar code symbols printed thereon, each having start and stop end characters and encoded data therebetween; said plurality of printed bar code symbols being positioned in a column generally defining a longitudinal axis; each symbol being so oriented that each bar of the bar code symbols is parallel to the axis and that two consecutive bar code symbols have different orientations, one being rotated 180° relative to another;

whereby a particular position along the ribbon is identified by scanning the bar code symbol corresponding to said particular position among said plurality of bar code symbols in said column; a symbol scan being considered successful when two different end characters are decoded following said symbol scan; and at least one bar code scanner connected to said computer, and being configured so as to read said bar code symbols on said bar code ribbons.

18. A bar-inventory management system as recited in claim 17, further comprising at least one access point for wirelessly connecting said at least one bar scanner to said computer server.

19. A bar-inventory management system as recited in claim 17, wherein at least one of said computer server and said at least one bar code scanner is configured to decode said bar code symbols.

20. A bar-inventory management system as recited in claim 17, wherein said computer server includes at least one database.

21. A bar-inventory management system as recited in claim 20, further comprising a plurality of unique inventory bar codes to be affixed to bottles.

22. A bar-inventory management system as recited in claim 21, wherein said computer database includes information associated to at least one of said bar code symbols on said bar code ribbons and said plurality of unique inventory bar codes.

23. A bar-inventory management system as recited in claim 22, wherein said information is related to volumes of the bottles.

24. A bar-inventory management system as recited in claim 17, said bar code symbols correspond to the "Interleaved 2 of 5" encoding system.

25. A bar-inventory management system as recited in claim 24, wherein said bar code ribbons have a width of about 8 mm.

26. A bar-inventory management system as recited in claim 17, wherein said bar code scanner is a handheld device.

27. A bar-inventory management system as recited in claim 17, wherein said bar code scanner is configured so as output a signal when a scan of one of said plurality of bar code symbols is successful.

28. A method for identifying positions along an axis on an object, said method comprising:

providing a unique bar code symbol at predetermined positions along the axis; each bar code symbol having start and stop end characters and encoded data therebetween; each bar code symbol being positioned in a column along the axis and being so oriented that each bar of the symbols is parallel to the axis and that two consecutive bar code symbols have different orientations, one being rotated 180° relative to another;

associating in a computer database each said unique bar code symbol to a corresponding one of said predetermined positions along the axis;

scanning a position along the axis until a bar code symbol having two different end characters is found; and searching in said computer database the position associated to the last scanned position.

* * * * *